Figure 1:
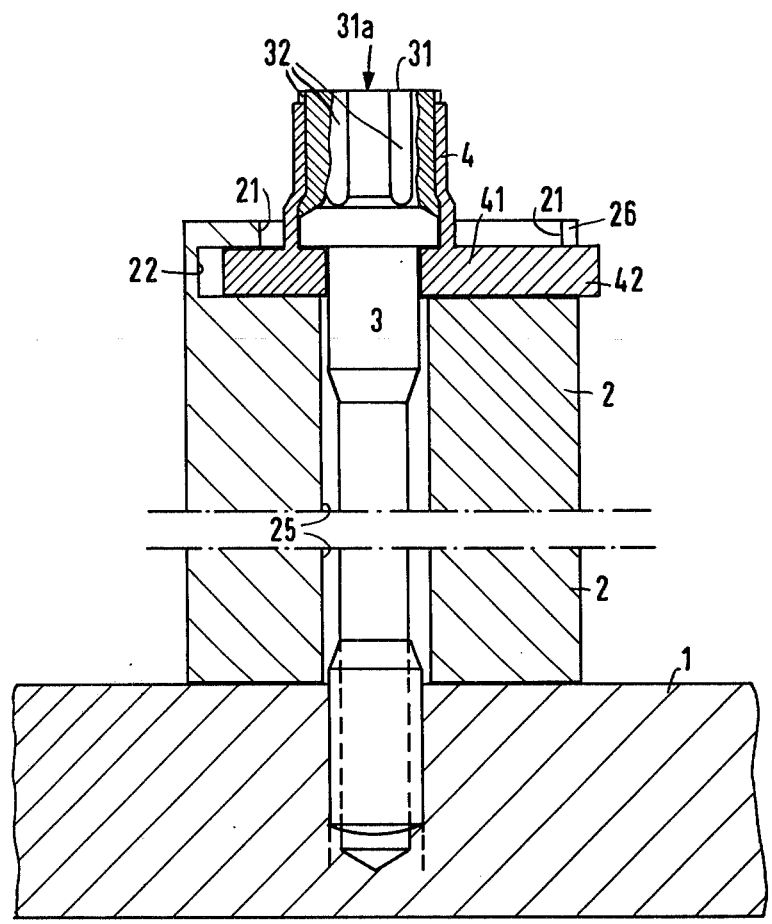

United States Patent [19]

Krause et al.

[11] 4,012,157
[45] Mar. 15, 1977

[54] CONNECTING DEVICE

[75] Inventors: Klaus Krause, Nurnberg; Ludwig Ilgmeier, Erlangen, both of Germany

[73] Assignee: Kraftwerk Union Aktiengesellschaft, Mulheim (Ruhr), Germany

[22] Filed: Mar. 1, 1976

[21] Appl. No.: 662,811

[52] U.S. Cl. .................................. 403/20; 176/38; 176/87; 151/53; 403/21; 403/DIG. 8
[51] Int. Cl.² .......................................... F16B 5/02
[58] Field of Search ............... 403/11, 20, 21, 388, 403/DIG. 8; 151/53; 52/758 F; 176/38, 87

[56] References Cited
UNITED STATES PATENTS

| 1,044,055 | 11/1912 | Johnson et al. | 403/20 X |
|---|---|---|---|
| 2,192,378 | 3/1940 | Horger | 151/53 |
| 2,216,208 | 10/1940 | Michon | 52/758 F X |
| 2,820,241 | 1/1958 | Schlage | 52/758 F X |
| 3,305,452 | 2/1967 | Remoleur | 176/87 |

FOREIGN PATENTS OR APPLICATIONS

| 2,042,312 | 12/1971 | Germany | 151/53 |
|---|---|---|---|
| 34,332 | 9/1965 | Japan | 151/53 |
| 913,407 | 12/1962 | United Kingdom | 151/53 |

Primary Examiner—Wayne L. Shedd
Attorney, Agent, or Firm—Herbert L. Lerner

[57] ABSTRACT

Bolt device for connecting a first component formed with a hole extending therethrough to a second component which is formed with a recess threaded to receive the bolt. The hole has three portions, namely a first shallow portion of large diameter which is an undercut of the end wall of the first component, a second shallow portion eccentric to the first shallow portion, the first component having a lateral groove connecting with the shallow portions, and an elongated recess portion having a smaller diameter than that of the first shallow portion and being coaxial to the first shallow portion. A cup-shaped member surrounds the head of the bolt to prevent rotation of the bolt, and has a disc-shaped base receivable in the undercut and a projection receivable in the lateral groove to prevent rotation of the cup and the bolt relative to the threaded component. The head of the bolt is formed with a recess engageable by a wrench which is used to rotate the bolt relative to the cup and thereby disengage the bolt from the cup.

8 Claims, 2 Drawing Figures

CONNECTING DEVICE

The invention of the instant application relates to a device for connecting one component to another component such as a wall, preferably within a space having poor accessibility, and particularly such a connecting device based upon the use of a pin-shaped member or bolt which is secured against undesired torsion or rotation. Such devices are advantageously required, for example, in nuclear reactor technology, with reactor pressure vessels wherein it is essential, in spite of being secured against rotation, that the threaded connection, on the one hand, be loosenable yet, on the other hand, in the event of the shearing of the pin-shaped member or bolt, no part thereof that is loosened should get into the coolant of the primary circulatory loop because, otherwise, disruption of the operation of the entire installation could occur. The securing of the bolt or pin-shaped member should thus simultaneously provide security against uncontrolled falling-out of a bolt that may become broken or sheared off.

The invention accordingly relates specifically to a device for connecting one component to another, such as a wall, preferably within a space that is poorly accessible, which includes at least one pin-shaped member or bolt which is threadedly securable with a threaded end thereof into the wall, and which has a shaft extending through a recess formed in the one component, the bolt having a head engaging over the one component and pressing it against the wall, a device for preventing torsion or rotation of the bolt being associated with the head thereof.

It is accordingly an object of the invention to provide a device for connecting one component to another component, such as a wall, which provides, on the one hand, a safety device against undesired loosening of a tightened bolt or screw, or the like, yet, on the other hand, affords an arbitrary loosening of the bolt with a rotary tool.

It is a further object of the invention to provide such a connecting device which will secure the bolt or pin-shaped member against falling out in the event it should shear off or become broken during operation. It is especially an object of the invention to provide such a connecting device that is suited for securing built-ins or components within pressure vessels of nuclear reactor installations, where the bolts or screws must be reliably secured against loosening and falling out of parts of the bolts or screws that might break or shear off.

With the foregoing and other objects in view, there is provided, in accordance with the invention, a device for connecting a first component to a second component, the first component being formed with a recess extending therethrough and comprising, serially and in communication with one another, an elongated recess portion of given diameter, a first shallow recess portion coaxial to and having a larger diameter than the elongated recess portion, part of the first shallow recess portion being an undercut of an end wall portion of the first component, and a second shallow recess portion eccentric to the first shallow recess portion and to the elongated recess portion, the first component being formed with a lateral groove at the location of an communicating with the shallow recess portions, a pin-shaped member having a shaft with a head at one end thereof and formed with a thread at the other end thereof, the shaft extending through the recess formed in the first component and being securable by the threaded end thereof in a correspondingly threaded bore formed in the second component so that the pin-shaped member by the head thereof engages the first component at one side of the latter and presses the first component at the opposite side thereof against the second component and means for securing the pin-shaped member against rotation relative to the first component, the securing means comprising a cup-shaped member surrounding the head of said pin-shaped member and engageable with the head so as to be mutually fixed against relative rotation, the cup-shaped member having a disc-shaped base receivable in the undercut part of the first shallow recess portion, and formed with a projection engageable in the lateral groove so as to secure the cup-shaped member and the pin-shaped member accordingly against rotation relative to the first component, the head being formed with means accessible from the free end surface thereof and engageable by a pin rotating device for rotating the pin-shaped member relative to the cup-shaped member so as to disengage the pin-shaped member from the cup-shaped member.

In accordance with another feature of the invention, the pin-shaped member is a necked-down bolt.

In accordance with a further feature of the invention, the pin-shaped member is a screw bolt having the head formed thereon.

In accordance with an added feature of the invention, the head of the pin-shaped member is formed with depressions, the cup-shaped member of the securing means having a wall plastically deformably compressible into the depressions.

In accordance with an additional feature of the invention, the pin-shaped member is formed with a multi-sided inner recess accessible from the free end of the head for receiving therein a matching wrench-like key, the multi-sided inner recess remaining freely accessible even when the wall of the cup-shaped member is compressed into the depressions.

In accordance with another feature of the invention, the head of the pin-shaped member is formed with an extension accessible from the free end of the head and engageable by the pin rotating device, the extensions remaining freely accessible even when the wall of the cup-shaped member is compressed into the depressions.

In accordance with yet another feature of the invention, the depressions are disposed at lateral flanks of the head of the pin-shaped member.

In accordance with a concomitant feature of the invention, the cup-shaped securing member and the head of the pin-shaped member engage one another in a manner that the pin-shaped member is secured against relative rotation therewith and against falling out from the cup-shaped member when the wall of the cup-shaped member is compressed into the depressions but is yieldably loosenable by the pin rotating device.

Although the invention is illustrated and described herein as embodied in connecting device, it is nevertheless not intended to be limited to the details shown, since various modifications and structural changes may be made therein without departing from the spirit of the invention and within the scope and range of equivalents of the claims.

Figure 2:
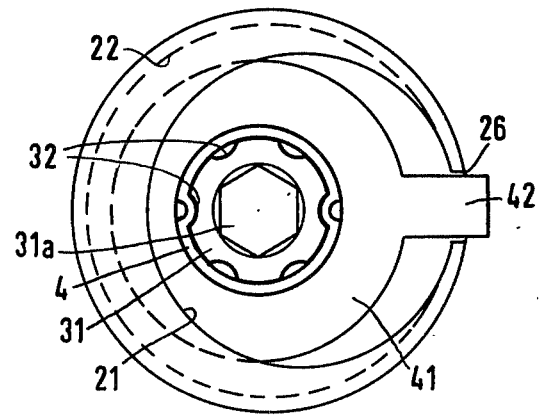

The construction and method of the invention, however, together with additional objects and advantages thereof will be best understood from the following description of specific embodiments when read in connection with the accompanying drawings, in which:

FIGS. 1 and 2 are respective longitudinal sectional and top plan views of the connecting device of the invention connecting two components one to the other.

Referring now to the drawing, there is shown in FIG. 1 a longitudinal sectional view of the connecting device of the invention which connects components 1 and 2. The component 1, is for example, the wall of a pressure vessel, to which a component 2 is to be threadedly secured. A necked-down bolt 3 serves per se to effect the threaded connection in a generally conventional manner. The head 31 thereof is formed with depressions 32 and is provided with an inner hexagonal edge 31a for a corresponding wrench key (not shown). A conventional non-illustrated safety device to prevent rotation and, hence, loosening of the bolt 3, generally employing a washer which, for example, would engage the bolt head, on the one hand, and the component 2, on the other hand, would be inadequate for this type of use because, upon the occurrence of any break or shear of the bolt shaft, that part of the bolt which would no longer be connected to the component 1 could fall out of the connection in an uncontrollable manner. For safe prevention of such an occurrence, a securing cup-shaped member 4 is provided, which has a wall that can be initially pressed into the depressions 32 of the bolt head. This security device protecting against torsion or rotation of the bolt does not, however, prevent subsequent loosening of the bolt, because upon forcible twisting or rotation of the bolt, the pressed-in parts of the plastically deformable wall of the cup-shaped member 4 can again be brought out of engagement with the depressions 32. In the embodiment shown in FIGS. 1 and 2, the base of the cup-shaped securing member 4 is constructed as a projecting or overhanging disc 41 that is formed with a securing nose or projection 42 which fits into a lateral slot 26 formed in the component 2 and serves to prevent the cup-shaped member 4 and, hence, the bolt secured thereto, from rotating relative to the component 2. The component 2 is formed with a shallow recess portion or bore 21 disposed excentrically to the elongated main bore 25 formed for the bolt. The diameter of the shallow recess portion 21 generally corresponds to that of the disc 41. A shallow relief or backing-off recess portion 22, part of which includes an undercut of an end surface portion of the component 2, is located between the shallow recess portion 21 and the main bolt bore 25 and is substantially concentric or coaxial to the latter. As can be readily seen, especially in FIG. 1, the lateral groove 26 communicates with both shallow recess portions 21 and 22.

The assembly of the connecting device of the invention is effected practically in the following manner:

Initially, the base disc 41 of the cup-shaped securing member 4 is inserted into the shallow recess portion 21 so that the securing nose or projection 42 thereof is disposed within the lateral groove 26 formed in the component 2. Then, the securing member 4 is shifted laterally i.e. in direction from the right-hand to the left-hand side of FIG. 2, so that the bore formed in the cup-shaped securing member 4 is aligned i.e. mutually coaxial, with the bore 25 formed in the component 2. The just-mentioned disposition of the securing member 4 relative to the component 2 is especially clearly shown in FIG. 2. The necked-down bolt 3 is thereafter inserted through the bore formed in the cup-shaped securing member 4 and through the bore 25 formed in the component 2 so as to be threadedly secured in the corresponding threaded bore formed in the component 1. Then, the relatively thin wall of the cup-shaped securing member 4 is pressed into the depressions 32 formed in the bolt head 31, thereby effecting the securing of the bolt 3 per se against torsion or rotation and consequent loosening. If the bolt 3 should shear off or break during the operation of the equipment containing such a connecting device according to the invention, the sheared-off bolt portion would be prevented from falling out of the connection due to the remaining bolt portion in the bore 25, together with the disc 41 as well as the cup-shaped portion of the securing member 4. This does not exclude or prevent the possibility, however, of being able to inspect or check the operability of such a connecting device according to the invention. In the event of the occurrence of a break or shear in the bolt shaft or shank, the head 31 thereof and the cup-shaped securing member 4 would exhibit a distinct looseness or play with respect to the component 2, a condition which could be readily sensed or detected with the aid of any suitable conventional detection device.

Of course, other structural variations of the aforedescribed embodiment of the connecting device of the invention are possible, especially with respect to the specific construction of the bolt head 31 and the insertion or application of the securing nosepiece or projection 42; furthermore, the undercut shallow recess portion 22 and/or the eccentric shallow recess portion 21 could be provided by welding or threadedly securing a suitably formed cover on the component 2. In each of these variants, as well as in the more specifically described embodiment of the invention, the basic principle of the invention remains, namely that of providing security against torsion or rotation i.e. loosening of the bolt 3 and of maintaining security against the falling out of a broken or sheared-off bolt 3 from the connection provided by the connecting device of the invention.

We claim:

1. Device for connecting a first component to a second component, the first component being formed with a recess extending therethrough and comprising, serially and in communication with one another, an elongated recess portion of given diameter, a first shallow recess portion coaxial to and having a larger diameter than said elongated recess portion, part of said first shallow recess portion being an undercut of an end wall portion of the first component, and a second shallow recess portion eccentric to said first shallow recess portion and to said elongated recess portion, said first component being formed with a lateral groove at the location of and communicating with said shallow recess portions, a pin-shaped member having a shaft with a head at one end thereof and formed with a thread at the other end thereof, said shaft extending through said recess formed in the first component and being securable by the threaded end thereof in a correspondingly threaded bore formed in the second component so that said pin-shaped member by said head thereof engages the first component at one side of the latter and presses the first component at the opposite side thereof against the second component, and means for securing said pin-shaped member against rotation relative to the first component, said securing means comprising a cup-shaped member surrounding said head of said pin-shaped member and engageable with said head so as to be mutually fixed against relative rotation, said cup-shaped member having a disc-shaped base receivable in said undercut part of said first shallow recess portion and formed with a projection engageable in said lateral groove so as to secure said cup-shaped member and said pin-shaped member accordingly against rotation relative to the first component, said head being formed with means accessible from the free end surface thereof and engageable by a pin rotating device for rotating said pin-shaped member relative to said cup-shaped member so as to disengage said pin-shaped member from said cup-shaped member.

2. Connecting device according to claim 1 wherein said pin-shaped member is a necked-down bolt.

3. Connecting device according to claim 1 wherein said pin-shaped member is a screw bolt having said head formed thereon.

4. Connecting device according to claim 1 wherein said head of said pin-shaped member is formed with depressions, said cup-shaped member of said securing means having a wall plastically deformably compressible into said depressions.

5. Connecting device according to claim 4 wherein said head of said pin-shaped member is formed with a multi-sided inner recess accessible from the free end of said head for receiving therein a matching wrench-like key, said multi-sided inner recess remaining freely accessible even when said wall of said cup-shaped member is compressed into said depressions.

6. Connecting device according to claim 4 wherein said head of said pin-shaped member is formed with an extension accessible from the free end of said head and engageable by said pin rotating device, said extension remaining freely accessible even when said wall of said cup-shaped member is compressed into said depressions.

7. Connecting device according to claim 4 wherein said depressions are disposed at lateral flanks of said head of said pin shaped member.

8. Connecting device according to claim 4 wherein said cup-shaped securing member and said head of said pin-shaped member engage one another in a manner that said pin-shaped member is secured against relative rotation therewith and against falling out from said cup-shaped member when said wall of said cup-shaped member is compressed into said depressions but it yieldably loosenable by said pin rotating device.

* * * * *